US008848803B2

(12) United States Patent
Osaki et al.

(10) Patent No.: US 8,848,803 B2
(45) Date of Patent: Sep. 30, 2014

(54) INFORMATION PROCESSING DEVICE AND METHOD, AND PROGRAM

(75) Inventors: Koichi Osaki, Kanagawa (JP); Atsushi Onoe, Kanagawa (JP)

(73) Assignee: Sony Corporation (JP)

( * ) Notice: Subject to any disclaimer, the term of this patent is extended or adjusted under 35 U.S.C. 154(b) by 262 days.

(21) Appl. No.: 12/737,634

(22) PCT Filed: May 31, 2010

(86) PCT No.: PCT/JP2010/059178
§ 371 (c)(1),
(2), (4) Date: Jan. 31, 2011

(87) PCT Pub. No.: WO2010/143550
PCT Pub. Date: Dec. 16, 2010

(65) Prior Publication Data
US 2011/0129018 A1    Jun. 2, 2011

(30) Foreign Application Priority Data
Jun. 10, 2009   (JP) .............................. P2009-138794

(51) Int. Cl.
H04N 7/26        (2006.01)
H04N 21/242      (2011.01)
H04L 29/06       (2006.01)
H04N 21/44       (2011.01)
H04N 21/43       (2011.01)

(52) U.S. Cl.
CPC .......... *H04N 21/242* (2013.01); *H04L 65/4069* (2013.01); *H04L 65/604* (2013.01); *H04N 21/44004* (2013.01); *H04L 65/80* (2013.01); *H04N 21/4302* (2013.01)
USPC ....... 375/240.25; 370/412; 370/476; 709/231

(58) Field of Classification Search
USPC ..................... 375/240.25–252, 240
See application file for complete search history.

(56) References Cited

U.S. PATENT DOCUMENTS 5,717,697 A *   2/1998   Yin .............................. 714/722
7,389,318 B2    6/2008   Yoshida et al.
(Continued)

FOREIGN PATENT DOCUMENTS

| JP | 2002-165148 A | 6/2002 |
| JP | 2005-295295 A | 10/2005 |
| JP | 2006-042273 A | 2/2006 |
| JP | 2006-049941 A | 2/2006 |
| WO | WO-2007/004611 A1 | 1/2007 |

OTHER PUBLICATIONS

Supplementary European Search Report from EP Application No. 10786081, dated Aug. 21, 2013.
(Continued)

*Primary Examiner* — Joseph Ustaris
*Assistant Examiner* — Talha Nawaz
(74) *Attorney, Agent, or Firm* — Lerner, David, Littenberg, Krumholz & Mentlik, LLP

(57) ABSTRACT

The present invention relates to an information processing device and method, and a program that make possible to reduce clock drift that occurs in streaming playback and to perform playback with more stability.
An information acquisition part analyzes, using a predetermined method, streams that are held in a buffer, and acquires, as data-amount calculation information, information necessary for calculating a data amount. A calculation part calculates, using the data-amount calculation information, a temporal data amount of the streams that are held in the buffer. A detection part detects, from a result of the calculation, decoder clock drift. When a decoder clock is too fast, a clock control unit controls the decoder clock so that the decoder clock has a speed which is slower than that at present. When the decoder clock is too slow, the clock control unit controls the decoder clock so that the decoder clock has a speed which is faster than that at present. The present invention can be applied to, for example, a communication system.

12 Claims, 6 Drawing Sheets

(56) References Cited

U.S. PATENT DOCUMENTS

| | | | |
|---|---|---|---|
| 2008/0022005 A1* | 1/2008 | Wu et al. | 709/231 |
| 2008/0031279 A1* | 2/2008 | Hatakeyama et al. | 370/476 |
| 2008/0259213 A1* | 10/2008 | Yoshida et al. | 348/521 |
| 2009/0210588 A1* | 8/2009 | Adachi et al. | 710/60 |
| 2012/0294315 A1* | 11/2012 | Sukonik et al. | 370/412 |

OTHER PUBLICATIONS

Office Action from Japanese Application No. 2009-138794, dated Sep. 10, 2013.

* cited by examiner

INFORMATION PROCESSING DEVICE AND METHOD, AND PROGRAM

CROSS-REFERENCES TO RELATED APPLICATIONS

The present application is a national phase entry under 35 U.S.C. §371 of International Application No. PCT/JP2010/059178 filed May 31, 2010, published on Dec. 16, 2010 as WO 2010/143550 A1, which claims priority from Japanese Patent Application No. JP 2009-138794 filed in the Japanese Patent Office on Jun. 10, 2009.

TECHNICAL FIELD

The present invention relates to an information processing device and method, and a program, and more particularly, it relates to an information processing device and method, and a program that make it possible to perform streaming playback so as to prevent image or sound disturbance from occurring even when the playback is performed for a long time.

BACKGROUND ART

Hitherto, live streaming playback using networks has been performed. When the live streaming playback is performed, there is a case in which control of, using time stamps included in streams, timing at which data is transferred to a decoder is not performed.

SUMMARY OF INVENTION

Technical Problem

However, in such a case, there is no effective means for synchronizing an encoder clock of a server and a decoder clock of a client. For this reason, there is a risk of occurrence of image or sound disturbance because of clock drift when playback is performed for a long time.

The present invention has been made in order to solve such a problem, and makes it possible to reduce clock drift that occurs in streaming playback and to perform playback with more stability.

Solution to Problem

An information processing device according to an aspect of the present invention includes: reception means for receiving data for streaming playback; holding means for holding the data that has been received by the reception means; decoding means for reading and decoding the data that is held in the holding means and that has been encoded in a predetermined manner; determination means for determining, from a temporal data amount of the data that is held in the holding means, whether or not a speed of a decoding process performed by the decoding means is appropriate; and control means for controlling, on the basis of a result of determination performed by the determination means, the speed of the decoding process performed by the decoding means.

The determination means may include: information acquisition means for acquiring, as data-amount calculation information, out of the data that is held in the holding means, information that is necessary for calculating a temporal data amount of all data which is held in the holding means; calculation means for calculating a temporal data amount using the data-amount calculation information that has been acquired by the information acquisition means; and detection means for detecting, by comparing the temporal data amount that has been calculated by the calculation means with a predetermined threshold, drift of a clock of the decoding process with respect to a clock of an encoding process to which the data has been subjected.

The information acquisition means may acquire, out of the data that is held in the holding means, as the data-amount calculation information, a time stamp of data that has been first held and a time stamp of data that has been last held.

The information acquisition means may acquire, as the data-amount calculation information, the number of packets that are held in the holding means and that have a PID of zero.

The information acquisition means may acquire, as the data-amount calculation information, the number of PCR packets that are held in the holding means.

On the basis of a result of detection performed by the detection means, when the clock of the decoding process is too fast, the control means may make the clock of the decoding process slower, and, when the clock of the decoding process is too slow, the control means may make the clock of the decoding process faster.

The detection means may compare the temporal data amount that has been calculated by the calculation means with the threshold that has been set using a temporal data amount of the data which is held in the holding means at a time of starting decoding of the data with the decoding means.

The detection means may compare the temporal data amount that has been calculated by the calculation means with the threshold that has been set using a temporal data amount of the data which is held in the holding means at a time of starting decoding of the data with the decoding means and using jitter that occurs at a time of transmission of the data.

The determination means may further include addition means for adding, to the data that has been received by the reception means, on a predetermined-data-amount-by-predetermined-data-amount basis, arrival-time information indicating a reception time of the data. The information acquisition means may acquire earliest arrival-time information and latest arrival-time information that are added to the data which is held in the holding means.

An information processing method or a program according to an aspect of the present invention includes the steps of: receiving data for streaming playback; holding the data that has been received; reading and decoding the data that is held and that has been encoded in a predetermined manner; determining, from a temporal data amount of the data that is held, whether or not a speed of a decoding process is appropriate; and controlling the speed of the decoding process on the basis of a result of determination.

According to an aspect of the present invention, data for streaming playback is received. The data that has been received is held. The data that is held and that has been encoded in a predetermined manner is read and decoded. Whether or not a speed of a decoding process is appropriate determined from a temporal data amount of the data that is held. The speed of the decoding process is controlled on the basis of a result of determination.

Advantageous Effects of Invention

According to the present invention, information can be processed. More particularly, clock drift that occurs in streaming playback can be reduced, and playback can be performed with more stability.

DESCRIPTION OF EMBODIMENTS

Figure 1:
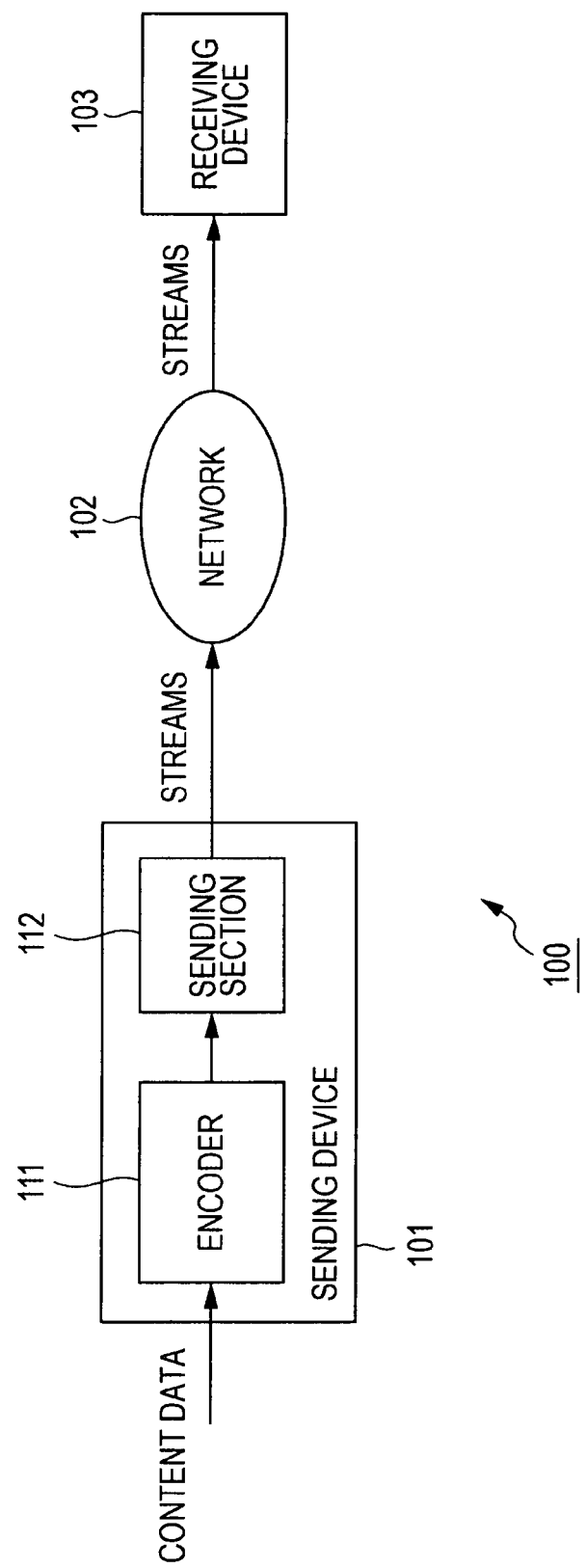
FIG. 1 is a diagram illustrating an example of a main configuration of a communication system to which the present invention is applied.

FIG. 1 is a block diagram illustrating an example of a configuration of a communication system to which the present invention is applied.

A communication system 100 illustrated in FIG. 1 is a communication system that plays back content data such as images or sounds between a plurality of devices via streaming. The communication system 100 has a sending device 101 and a receiving device 103 that is connected to the sending device 101 via a network 102.

The sending device 101 is a device that sends content data, which is supplied from the outside, as streaming data to the receiving device 103 via the network 102. The content data is data serving as content including, for example, images or sounds. The sending device 101 has an encoder 111 and a sending section 112.

The encoder 111 encodes and compresses the content data, which has been supplied, using a predetermined encoding scheme such as MPEG (Moving Picture Experts Group) or JPEG (Joint Photographic Experts Group) 2000, and supplies the encoded data to the sending section 112. The sending section 112 packetizes the encoded data, which has been supplied from the encoder 111, as data (streams) for streaming playback, and sends the packetized streams to the receiving device 103 via the network 102.

Note that the sending device 101 may have other functions. For example, the sending device 101 may have a content-data generating function such as a camera or a microphone. Furthermore, for example, the sending device 101 may have a storage section that stores content data. The content data may be read from the storage section, and may be supplied to the encoder.

The streams, which have been sent by the sending section 112, are supplied to the receiving device 103 via the network 102. The network 102 is any network for connecting a plurality of devices to each other and for allowing the devices to perform communication therebetween, such as the Internet or a LAN (Local Area Network). The network 102 may be configured using a plurality of networks. Furthermore, the network 102 may be configured using a wired technology, may be configured using a wireless technology, or may be configured using both wired and wireless technologies.

While the receiving device 103 is receiving the streams, which have been supplied via the network 102, the receiving device 103 decodes the streams, decompresses the content data, plays back the content data (via streaming), and outputs the content data to a monitor, a speaker, or the like. As a matter of course, the decompressed content data may be supplied to another device that is provided outside the receiving device 103.

Figure 2:
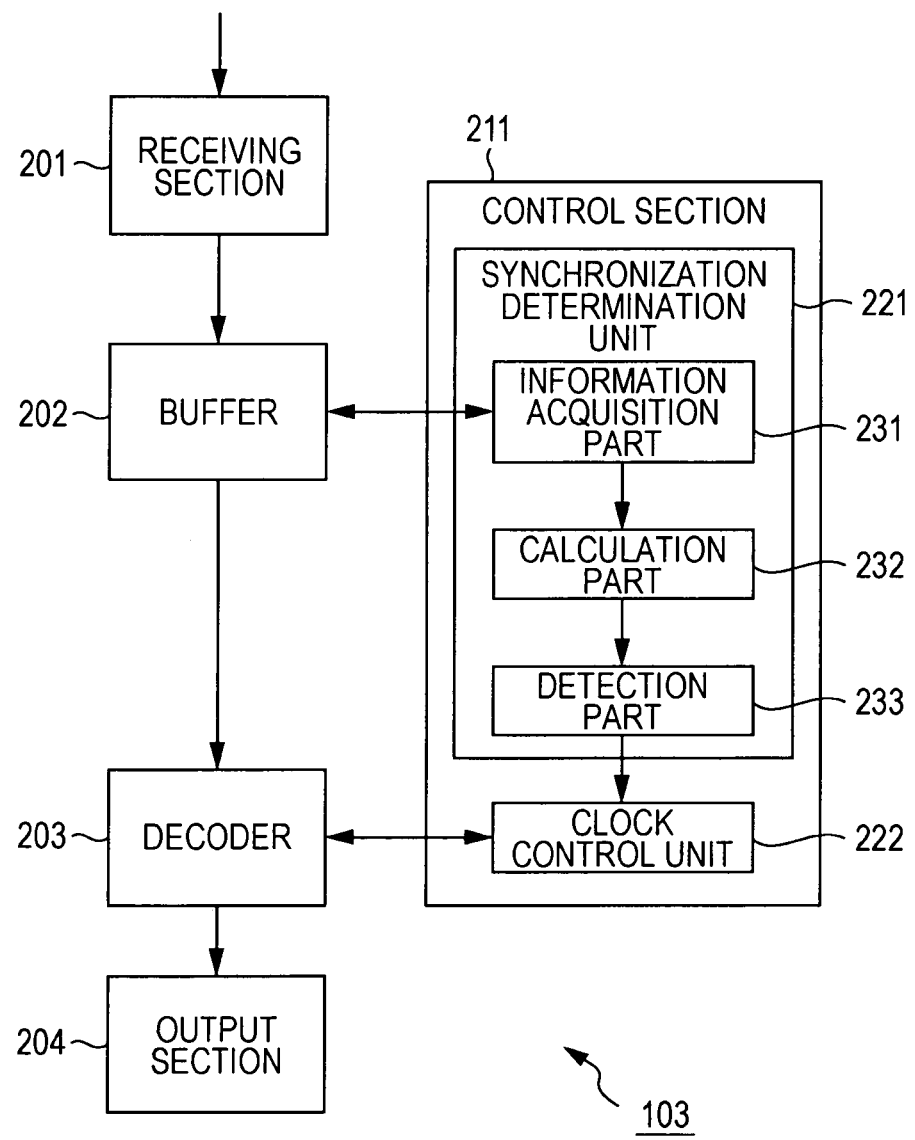
FIG. 2 is a block diagram illustrating an example of a detailed configuration of a receiving device.

FIG. 2 is a block diagram illustrating an example of a detailed configuration of the receiving device 103 illustrated in FIG. 1.

As illustrated in FIG. 2, the receiving device 103 has a receiving section 201, a buffer 202, a decoder 203, an output section 204, and a control section 211.

The receiving section 201 is a communication interface that is connected to the network 102. The receiving section 201 acquires streams, which have been supplied via the network 102, and supplies the streams to the buffer 202. The buffer 202 is configured using a storage medium such as a RAM (Random Access Memory), and temporarily holds data that has been supplied from the receiving section 201. The buffer 202 supplies, to the decoder 203, encoded data that has been requested by the decoder 203, out of the encoded data which is held, or supplies the encoded data, which is held, to the decoder 203 at timing that is predetermined in accordance with the processing speed of the decoder 203.

The decoder 203 decompresses and decodes the encoded data, which has been acquired from the buffer 202, and supplies content data that has been decompressed, to the output section 204. The output section 204 has, for example, a monitor or a speaker, and outputs the content data that has been supplied from the decoder 203. For example, the output section 204 displays images on the monitor, or outputs sounds from the speaker.

The control section 211 controls an operation (for example, a clock) of the decoder 203 on the basis of an information item that has been extracted from the data which is held in the buffer 202. The control section 211 has a synchronization determination unit 221 and a clock control unit 222.

The synchronization determination unit 221 performs, on the basis of the data which is held in the buffer 202, a process associated with determination of whether or not the speed of a decoding process that the decoder 203 performs is appropriate. More specifically, the synchronization determination unit 221 performs a process associated with determination of whether or not a clock of the decoder 203 and a clock of the encoder 111 of the sending device 101 are synchronized with each other.

The synchronization determination unit 221 has an information acquisition part 231, a calculation part 232, and a detection part 233. The information acquisition part 231 extracts necessary information items from the data that is held in the buffer 202. The calculation part 232 calculates, using the information items that have been acquired by the information acquisition part 231, a temporal data amount of the data that is held in the buffer 202.

Note that the term "temporal data amount" does not refer to a simple information amount (a data size), but rather to an amount corresponding to a playback time over which data is played back as content. In other words, the calculation part 232 calculates a "temporal data amount" as a value indicating the amount of data that is held in the buffer 202 for a playback time.

The detection part 233 compares the temporal data amount, which has been calculated by the calculation part 232, with a predetermined threshold, thereby determining whether or not the speed of the clock of the decoder 203 is appropriate.

The clock control unit 222 controls the clock of the decoder 203 on the basis of a result of determination performed by the synchronization determination unit 221 (the detection part 233) so that the clock of the decoder 203 has an appropriate speed.

Figure 3:
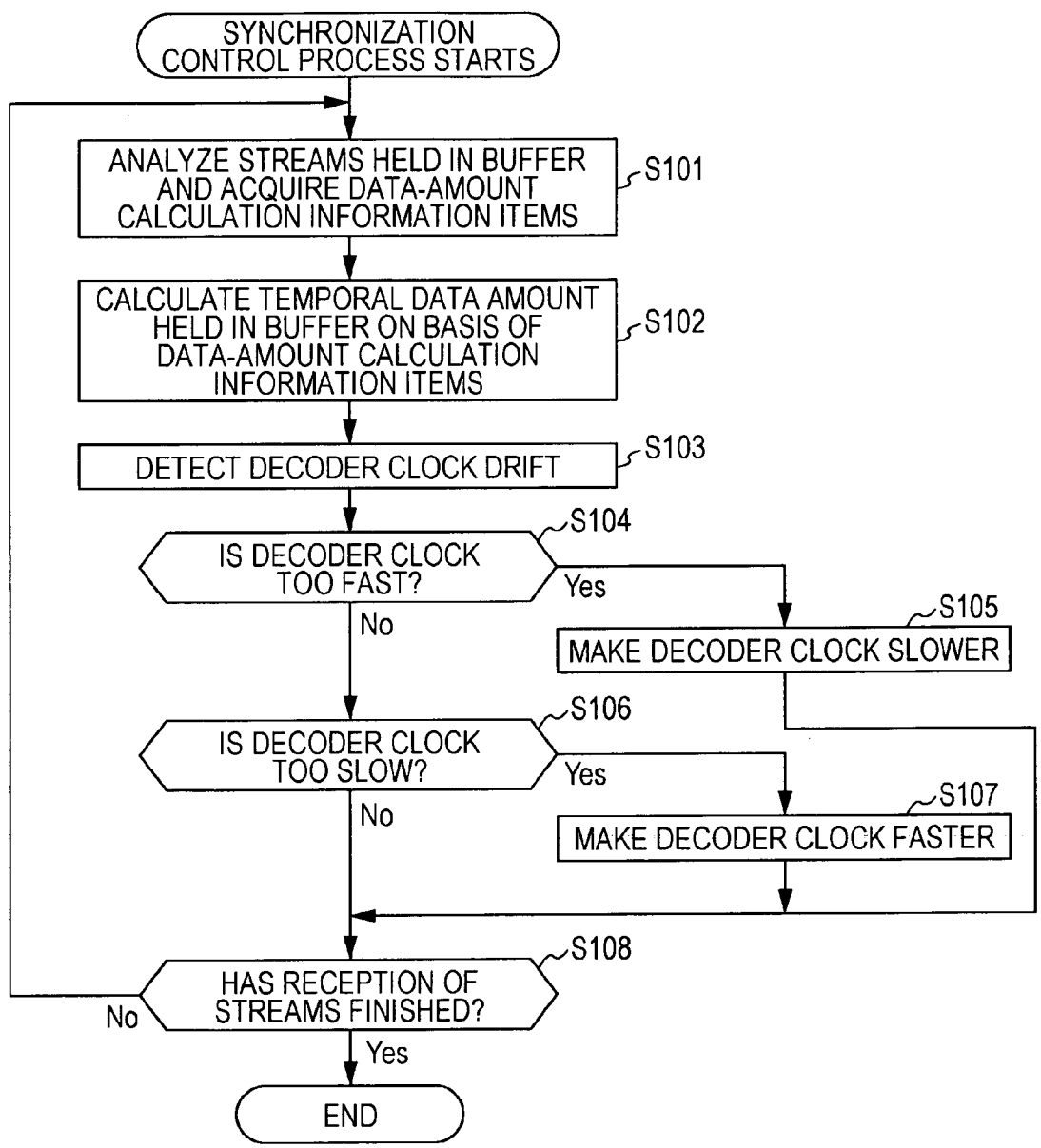
FIG. 3 is a flowchart for explaining a flow of a synchronization control process.

An example of a flow of a specific process will be described with reference to a flowchart illustrated in FIG. 3.

When the receiving device 103 starts reception of data for streaming playback, the control section 211 starts a synchronization control process.

When the synchronization control process starts, in step S101, the information acquisition part 231 of the synchronization determination unit 221 analyzes, using a predetermined method, streams (data) that are held in the buffer 202, and acquires, as data-amount calculation information items, information items necessary for calculating a data amount.

For example, when the streams are TTSs (Timed Transport-Streams), a time stamp of the TTS that has been last held in the buffer 202 is compared with a time stamp of the TTS that has been first held in the buffer 202 (a difference is calculated), whereby a temporal data amount of the streams that are held in the buffer 202 can be calculated.

Accordingly, in this case, the information acquisition part 231 acquires the time stamp of the TTS that has been last held in the buffer 202 and the time stamp of the TTS that has been first held in the buffer 202 as data-amount calculation information items.

Furthermore, for example, a case in which it is guaranteed that PATs (Program Association Tables) serving as PSI (Program Specific Information) are inserted between the streams at intervals each of which corresponds to a content playback time of 100 msec, the number of packets that have a PID of zero and that exist in the buffer 202 is counted, whereby a temporal data amount of the streams that are held in the buffer 202 can be calculated.

PSI is an information item describing which program streams belong to. A PMT indicates an information item in which each of PIDs of images or sounds included in programs is stored. A PAT is a table in which a list of programs included in streams is stored using a list of PIDs stored in the PMT. It is determined that a PID of each PAT is necessarily zero. In other words, counting of the number of packets having a PID of zero is equivalent to counting of the number of PATs that are inserted every 100 msec.

Accordingly, in this case, the information acquisition part 231 counts the number of packets having a PID of zero, and acquires a result of the counting as a data-amount calculation information item. Note that, in this case, because it is necessary to refer to TS headers of all of the packets that are held in the buffer 202, a load imposed on the information acquisition part 231 is higher than that in the above-described case in which TTS time stamps are used.

Furthermore, for example, a case in which it is guaranteed that PCRs (Program Clock References) are inserted between the streams at intervals each of which corresponds to a content playback time of 100 msec, the number of PCR packets is counted, whereby a temporal data amount of the streams that are held in the buffer 202 can be calculated.

A PCR indicates a time information item that is used as a clock reference. Between the streams, a PCR is inserted every 100 msec. Accordingly, a temporal data amount of the streams that are held in the buffer 202 can be calculated from a count value that is obtained by counting the number of PCRs. The information acquisition part 231 analyzes all PATs and PMTs for the streams that are held in the buffer 202. The information acquisition part 231 counts the number of PCR packets, and acquires a result of the counting as a data-amount calculation information item.

Note that, in this case, because it is necessary to analyze all PATs and PMTs held in the buffer 202, a load imposed on the information acquisition part 231 is higher than that in the above-described case in which TTS time stamps are used or the above-described case in the number of PATs is counted.

When data-amount calculation information items are acquired, in step S102, the calculation part 232 calculates, using the data-amount calculation information items, a temporal data amount of the streams that are held in the buffer 202.

In step S103, the detection part 233 detects, from a result of the calculation, "drift" (hereinafter, referred to as "decoder clock drift") of the clock (decoder clock) of the decoder 203 with respect to the clock (encoder clock) of the encoder 111.

A transmission bit rate at which streams are transmitted via the network 102 corresponds to a speed at which content is played back. It is supposed that, while the reception device 103 is receiving streams that have been sent, the reception device 103 performs live streaming playback in which the streams are played back substantially immediately (substantially in real time).

Supposing that the receiving device 103 is in an ideal state in which network jitter is zero and there is also no decoder clock drift, the input/output rates of the buffer 202 are substantially the same as each other. In other words, during such live streaming playback, the temporal data amount of streams that are held in the buffer 202 is substantially constant. For example, when streaming playback starts, supposing that the temporal data amount of streams that are held in the buffer 202 is an amount of data corresponding to m seconds, data corresponding to m seconds is always held in the buffer 202.

Accordingly, in this case, the detection part 233 monitors the temporal data amount of streams that are held in the buffer 202, and detects drift of the temporal data amount from m, thereby detecting network jitter or decoder clock drift.

Meanwhile, m can be approximated using a time from the start of reception of data from a network to the start of playback. The reason for this is that, under an ideal environment in which there is no network jitter as described above, if data is received for m seconds, data corresponding to m seconds for which content is played back should be acquired. In other words, in order to hold, in the buffer 202, data corresponding to m seconds for which content is played back, reception for m seconds is necessary. Accordingly, as described above, m can be approximated using a time from the start of reception of data from a network to the start of playback.

Supposing that network jitter is not zero, the reception rate changes with time. Accordingly, the temporal data amount of streams that are held in the buffer 202 is not constant because the temporal data amount is influenced by the network jitter. When the temporal data amount is denoted by m' in this case and the network jitter is at most n seconds, an appropriate value of the m' can be represented by Expression (1) given below.

$$m-n \leq m' \leq m+n \qquad (1)$$

The detection part 233 monitors the temporal data amount of streams that are held in the buffer 202, and, when the m' deviates from the above-mentioned range, the detection part 233 determines that decoder clock drift occurs. If an expression m'<m−n is established, the decoder clock is faster than the encoder clock, and, if an expression m+n<m' is established, the decoder clock is slower than the encoder clock.

When the detection part 233 performs detection of decoder clock drift as described above, in step S104, the detection part 233 determines, on the basis of a result of the detection, whether or not the decoder clock is too fast (with respect to the encoder clock). When it is determined that the decoder clock is too fast, the process proceeds to step S105. In step S105, in response to a result of the determination, the clock control unit 222 controls the decoder 203 so that the decoder clock has a speed which is lower than that at present. In other words, the clock control unit 222 reduces the processing speed of the decoder 203 so that the processing speed is lower than that at present. When the process in step S105 finishes, the process proceeds to step S108.

Furthermore, in step S104, when it is determined that the data clock is not too fast, the process proceeds to step S106. In step S106, the detection part 233 determines, on the basis of a result of the detection, whether or not the decoder clock is too slow (with respect to the encoder clock). When it is determined that the decoder clock is too slow, the process proceeds to step S107. In step S107, in response to a result of the determination, the clock control unit 222 controls the decoder 203 so that the decoder clock has a speed higher than that at present. In other words, the clock control unit 222 increases the processing speed of the decoder 203 so that the processing speed is higher than that at present. When the process in step S107 finishes, the process proceeds to step S108.

Furthermore, in step S106, when it is determined that the decoder clock is not too slow, i.e., that the speed of the decoder clock is appropriate, the process proceeds to step S108.

In step S108, the information acquisition part 231 determines whether or not reception of streams has finished. When it is determined that reception of streams has not finished, the process returns to step S101, and the processes in step S101 and thereafter are repeated. Furthermore, when it is determined in step S108 that reception of streams has finished, the synchronization control process finishes.

As described above, the control section 211 detects decoder clock drift on the basis of a temporal data amount of streams that are held in the buffer 202, and controls the speed of the decoder clock on the basis of a result of the detection. In other words, the control section 211 controls the processing speed of the decoder 203. In this manner, the control section 211 can perform control so that the speed of the decoder clock coincides with the speed of the encoder clock, i.e., so that the processing speed of the decoder 203 coincides with the processing speed of the encoder 111. Clock drift can be reduced, and occurrence of buffer overflow or underflow that is caused by the clock drift can be reduced.

In other words, in live streaming playback, even in a case in which control of, using time stamps of streams, timing at which data is input to the decoder 203 is not performed or cannot be performed, the receiving device 103 can perform streaming playback with stability so as to prevent image or sound disturbance from occurring even when the playback is performed for a long time.

Note that jitter exists also in the m in reality, and accuracy with which the m is calculated also differs depending on a method for calculating the m. For this reason, it is preferable that a threshold for detecting clock drift such as the above-mentioned threshold be appropriately set in accordance with environments such as a system, a device, and a method for the m.

In the description given above, a method in which a temporal data amount of streams that are held in the buffer 202 is calculated utilizing data that exists in the streams is described. However, the temporal data amount of streams may be calculated using methods other than the above-described method.

For example, arrival times (reception times) of streams may be utilized.

Figure 4:
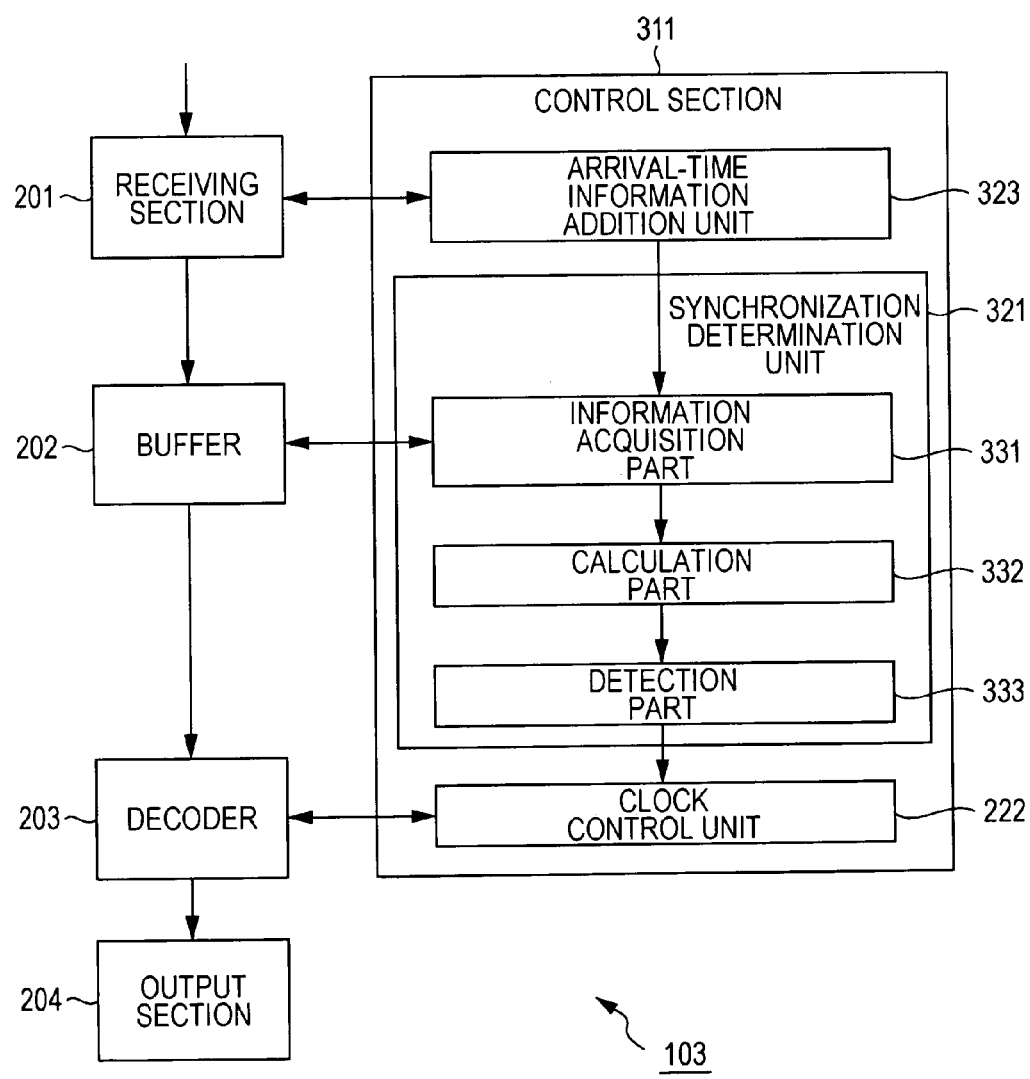
FIG. 4 is a block diagram illustrating another example of the configuration of the receiving device.

FIG. 4 is a block diagram illustrating an example of a detailed configuration of the receiving device 103 in such a case. Configurations that are similar to those illustrated in FIG. 2 are denoted by the same reference numerals.

In FIG. 4, although the receiving device 103 basically has a configuration that is similar to the configuration of the control section 211 in a case illustrated in FIG. 2, the receiving device 103 has a control section 311 instead of the control section 211. Although the control section 311 basically has a configuration that is similar to the configuration of the control section 211, the control section 311 has a synchronization determination unit 321 instead of the synchronization determination unit 221 of the control section 211, and further has an arrival-time information addition unit 323.

The arrival-time information addition unit 323 adds, on a predetermined-data-unit (for example, a TCP packet)-by-predetermined-data-unit basis, arrival-time information items indicating arrival times to streams that have been received by the receiving section 201. Although an arrival-time information item may be any data regarding an information item indicating a time, the arrival-time information item is generated, for example, using a system clock of the receiving device 103. The receiving section 201 supplies the streams, to which the arrival-time information items have been added, to the buffer 202, and causes the buffer 202 to hold the streams.

The synchronization determination unit 321 has an information acquisition part 331, a calculation part 332, and a detection part 333 as in the case of the synchronization determination unit 221.

The information acquisition part 331 acquires, as data-amount calculation information items, an earliest arrival-time information item and a latest arrival-time information item that are added to the streams which are held in the buffer 202.

The calculation part 332 obtains the difference between the arrival-time information items, thereby calculating a temporal data amount of the streams that are held in the buffer 202. The detection part 333 compares a result of the calculation with a predetermined threshold, thereby detecting decoder clock drift.

Figure 5:
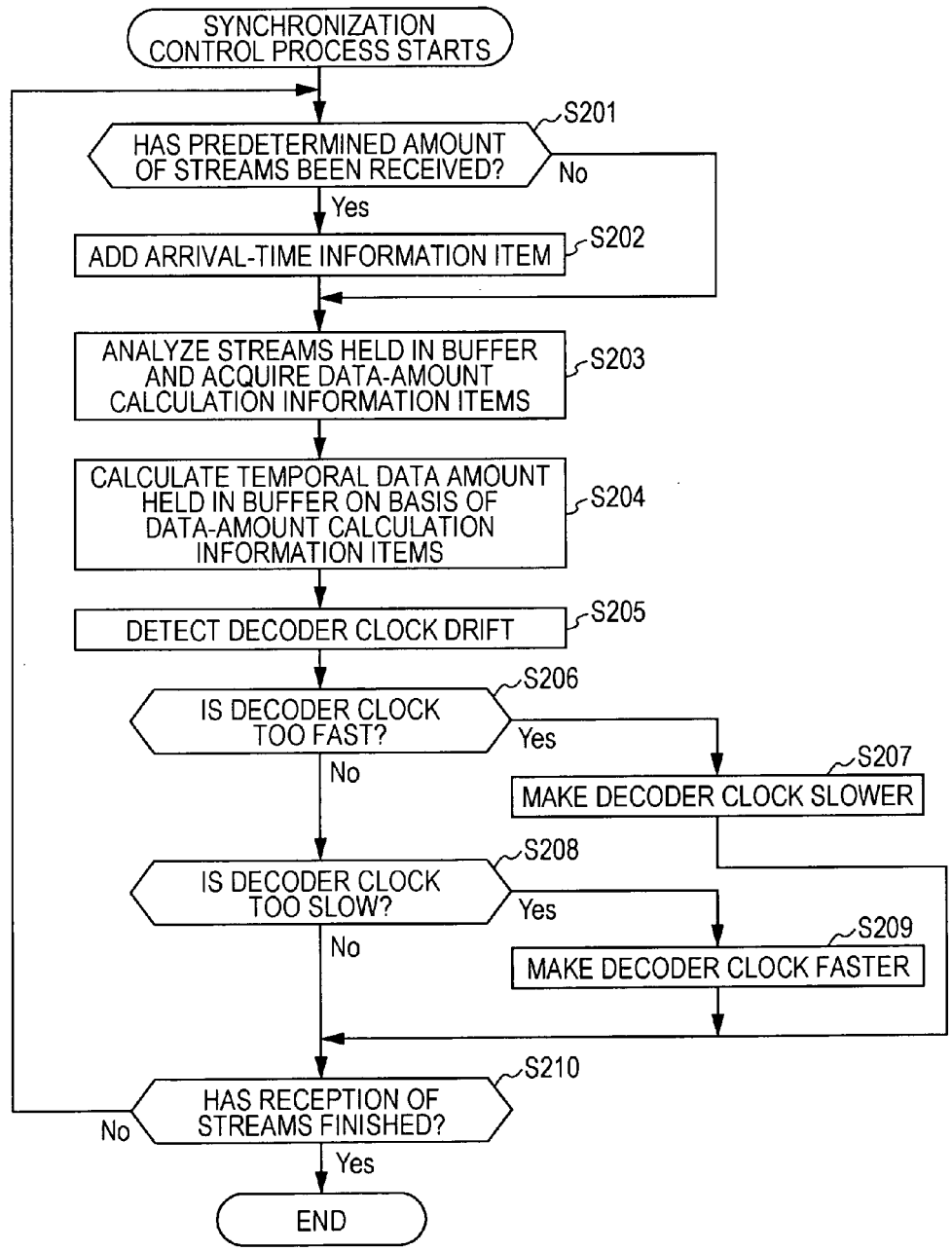
FIG. 5 is a flowchart for explaining another flow of the synchronization control process.

An example of a flow of a synchronization control process in this case will be described with reference to a flowchart illustrated in FIG. 5. The synchronization control process corresponds to the synchronization control process that is described with reference to the flowchart illustrated in FIG. 3.

When streaming playback starts and the synchronization control process starts, in step S201, the arrival-time information addition unit 323 monitors streams that have been received by the receiving section 201, and determines whether or not a predetermined amount, which is determined in advance, of streams has been received. When it is determined that the predetermined amount of streams has been received, the process to the step S202, and the arrival-time information addition unit 323 adds an arrival-time information item to the received data. When an arrival-time information item is added, the process proceeds to step S203. Furthermore, when it is determined in step S201 that the predetermined amount of streams has not been received, the process in step S202 is omitted, and the process proceeds to step S203.

In step S203, the information acquisition part 331 acquires, as data-amount calculation information items, the arrival-time information item that is added to the stream which has been last held in the buffer 202 and the arrival-time information item that is added to the stream which has been first held in the buffer 202. In step S204, the calculation part 332 obtains the difference between the arrival-time information items that have been acquired by the information acquisition part 331, thereby calculating a temporal data amount of the data that is held in the buffer 202.

In step S205, the detection part 333 detects decoder clock drift on the basis of a result of the calculation.

As described above, in case in which the network jitter is at most n seconds, supposing that playback starts m seconds after live streaming reception starts, regarding a temporal data amount m' of streams that are held in the buffer 202, when an expression m'<m−n or m+n<m' is established, decoder clock drift is detected.

Here, a temporal data amount that is calculated from arrival times of the streams is denoted by m". The receiving device 103 monitors the m" using relationships among the m", the m, and the n in which the expression m'<m−n or m+n<m' is always established, whereby the receiving device 103 can detect decoder clock drift.

When the network jitter is considered, the m" and m' have a relationship represented by Expression (2) given below.

$$m''-n \leq m' \leq m''+n \quad (2)$$

In order to always establish the expression m'<m−n, it is necessary to establish the expression also when the m' is maximized. Accordingly, it is necessary to establish an expression m"+n<m−n that is obtained from Expression (2). In other words, it is necessary to establish an expression m"<m−2n.

Furthermore, in order to always establish the expression m+n<m', it is necessary to establish the expression also when the m' is minimized. Accordingly, it is necessary to establish an expression m+n<m"−n that is obtained from Expression (2). In other words, it is necessary to establish an expression m+2n<m".

As described above, when the expression m"<m−2n is established, the decoder clock is fast, and, when the expression m+2n<m" is established, the decoder clock is slow. The detection part 333 detects decoder clock drift in this manner.

When the decoder clock is fast, the clock control unit 222 makes the decoder clock slower, and, when the decoder clock is slow, the clock control unit 222 makes the decoder clock faster. In other words, each of the processes in steps S206 to S210 is performed in a manner that is similar to a manner in which a corresponding one of the processes in steps S104 to S108 illustrated in FIG. 3 is performed.

In other words, when the decoder clock is too fast, the clock control unit 222 controls the decoder clock so that the decoder clock has a speed which is lower than that at present. In other words, the clock control unit 222 reduces the processing speed of the decoder 203 so that the processing speed is lower than that at present. In contrast, when the decoder clock is too slow, the clock control unit 222 controls the decoder clock so that the decoder clock has a speed which is higher than that at present. In other words, the clock control unit 222 increases the processing speed of the decoder 203 so that the processing speed is higher than that at present.

As described above, the control section 311 detects decoder clock drift on the basis of a temporal data amount of streams that are held in the buffer 202. The control section 311 controls the speed of the decoder clock on the basis of a result of the detection, whereby the control section 311 can perform control so that the speed of the decoder clock coincides with the speed of the encoder clock. Clock drift can be reduced, and occurrence of buffer overflow or underflow that is caused by the clock drift can be reduced.

In other words, in live streaming playback, even in a case in which control of, using time stamps of streams, timing at which data is input to the decoder 203 is not performed or cannot be performed, the receiving device 103 can perform streaming playback with stability so as to prevent image or sound disturbance from occurring even when the playback is performed for a long time.

Note that jitter exists also in the m in reality, and accuracy with which the m is calculated also differs depending on a method for calculating the m. For this reason, it is preferable that a threshold for detecting clock drift such as the above-mentioned threshold be appropriately set in accordance with environments such as a system, a device, and a method for the m.

In the description given above, a method in which the speed of the decoding process performed by the decoder 203 is controlled by controlling the speed of the clock of the decoder 203 is described. However, the speed of the decoding process may be controlled using methods other than the method using the clock.

The series of processes described above can also be performed by hardware, or can also be performed by software. In this case, for example, the series of processes may be implemented as a personal computer as illustrated in FIG. 6.

Figure 6:
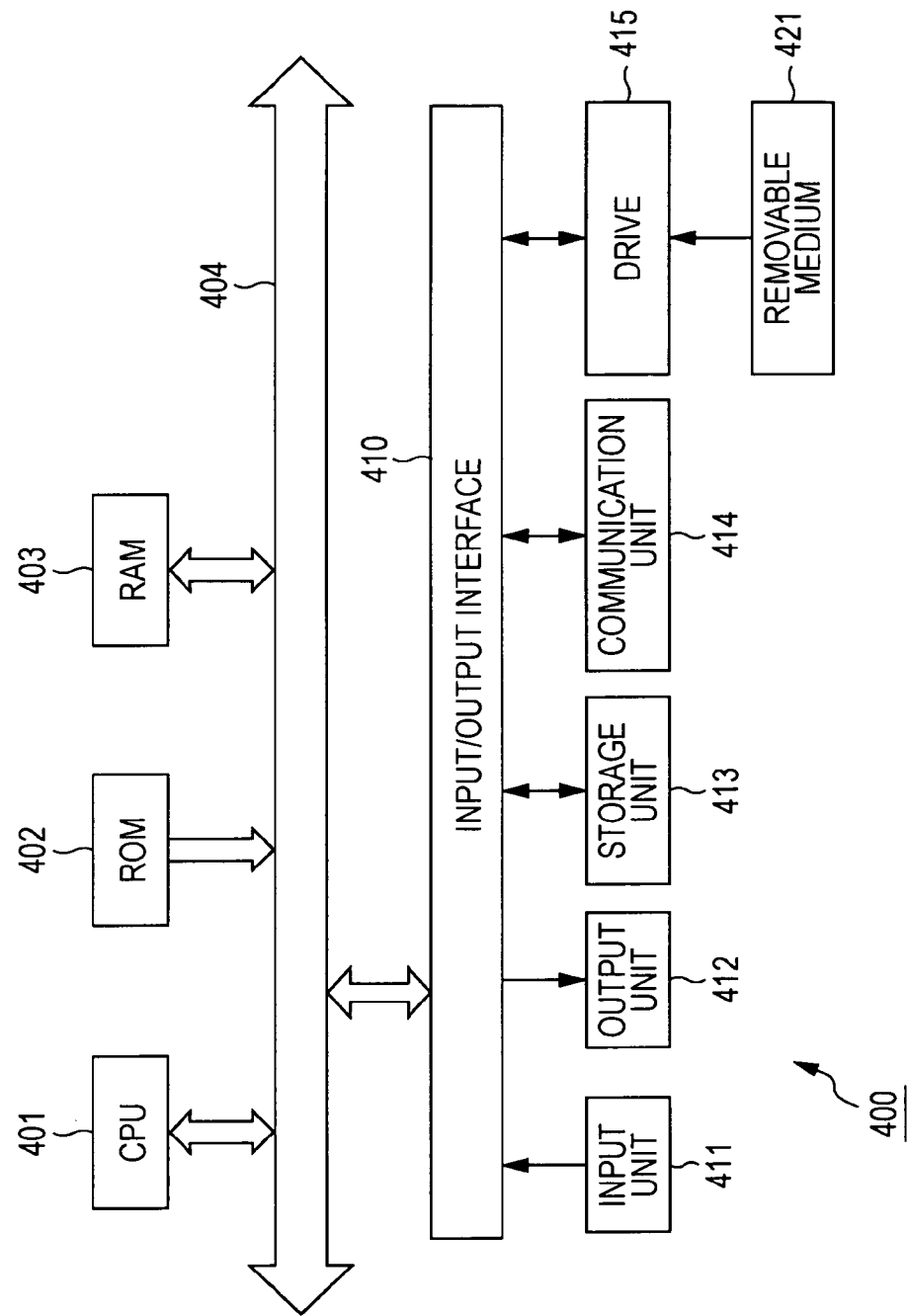
FIG. 6 is a diagram illustrating an example of a configuration of a personal computer to which the present invention is applied.

In FIG. 6, a CPU (Central Processing Unit) 401 of a personal computer 400 performs various types of processes in accordance with a program that is stored in a ROM (Read Only Memory) 402 or a program that is loaded from a storage unit 413 into a RAM 403. The RAM 403 also stores data or the like that is necessary for performing the various types of processes with the CPU 401, as appropriate.

The CPU 401, the ROM 402, and the RAM 403 are connected to one another via a bus 404. An input/output interface 410 is also connected to the bus 404.

An input unit 411 that is configured using a keyboard, a mouse, or the like, an output unit 412 that is configured using a display such as a CRT (Cathode Ray Tube) display or an LCD (Liquid Crystal Display) and a speaker or the like, the storage unit 413 that is configured using a hard disk or the like, and a communication unit 414 that is configured using a modem or the like are connected to the input/output interface 410. The communication unit 414 performs a communication process via a network including the Internet.

Furthermore, a drive 415 is connected to the input/output interface 410 as necessary. A removable medium 421 that is configured using a magnetic disk, an optical disk, a magneto-optical disk, a semiconductor memory, or the like is mounted as appropriate. A computer program that is read from the removable medium 421 is installed in the storage unit 413 as necessary.

When the series of processes described above is performed by software, programs constituting the software are installed from a network or a recording medium.

For example, as illustrated in FIG. 6, the recording medium is configured using the removable medium 421 which is distributed separately from the body of an apparatus in order to provide the programs for a user and on which the programs are recorded. The removable medium 421 is configured using a magnetic disk (including a flexible disk), an optical disc (including a CD-ROM (Compact Disc-Read Only Memory) and a DVD (Digital Versatile Disc)), a magneto-optical disc (including an MD (Mini Disc)), or a semiconductor memory. Alternatively the recording medium including the programs may be configured using, for example, the ROM 402 or a hard disk included in the storage unit 413, which are provided for a user in a state in which they are embedded in the body of an apparatus in advance and on which the programs are recorded.

Note that, in the present specification, the steps defining the programs recorded on the recording medium include processes that are sequentially performed in the described order of the steps, and may also include processes that are performed in parallel or individually, not necessarily sequentially.

Furthermore, in the present specification, the term "system" refers to an entire apparatus including a plurality of devices.

Note that, in the above description, a configuration that is described as a single device may be divided, and may be configured as a plurality of devices. Conversely, configurations that are described above as a plurality of devices may be combined into and configured as a single device. Moreover, as a matter of course, a configuration other than the above-described configurations above may be added to the configurations of the individual devices. In addition, a portion of the configuration of a certain device may be included in the configuration of another device if substantially the same configuration or operation of the entire system can be achieved. In other words, the embodiments of the present invention are not to be limited to the embodiments described above, and a variety of modifications can be made without departing from the scope of the present invention.

REFERENCE SIGNS LIST 100 communication system
101 sending device
102 network
103 receiving device
111 encoder
112 sending section
201 receiving section
202 buffer
203 decoder
204 output section
211 control section
221 synchronization determination unit
222 clock control unit
231 information acquisition part
232 calculation part
233 detection part
311 control section
321 synchronization determination unit
323 arrival-time information addition unit
331 information acquisition part
332 calculation part
333 detection part

The invention claimed is:

1. An information processing device comprising:
reception means for receiving data for streaming playback;
holding means for holding the data that has been received by the reception means;
decoding means for reading and decoding the data that is held in the holding means and that has been encoded in a predetermined manner;
determination means for determining, from a temporal data amount of the data that is held in the holding means, whether or not a speed of a decoding process performed by the decoding means is appropriate;
and control means for controlling, on the basis of a result of determination performed by the determination means, the speed of the decoding process performed by the decoding means, in which the temporal data amount refers to an amount of data held in the holding means for a playback time, wherein the amount is obtained from a count of a number of PCR (program clock reference) packets
wherein a PCR is inserted every 100 msec between streams of packets; and
wherein all program association tables and PMTs for the streams that are held in the holding means are analyzed as part of obtaining the temporal data amount.

2. The information processing device according to claim 1, wherein the determination means includes
calculation means for calculating a temporal data amount using the count of the number of packets having the PID of zero or the count of the number of the PCR packets, and
detection means for detecting, by comparing the temporal data amount that has been calculated by the calculation means with a predetermined threshold, drift of a clock of the decoding process with respect to a clock of an encoding process to which the data has been subjected.

3. The information processing device according to claim 2, wherein, on the basis of a result of detection performed by the detection means, when the clock of the decoding process is too fast, the control means makes the clock of the decoding process slower, and, when the clock of the decoding process is too slow, the control means makes the clock of the decoding process faster.

4. The information processing device according to claim 2, wherein the detection means compares the temporal data amount that has been calculated by the calculation means with the threshold that has been set using a temporal data amount of the data which is held in the holding means at a time of starting decoding of the data with the decoding means.

5. The information processing device according to claim 2, wherein the detection means compares the temporal data amount that has been calculated by the calculation means with the threshold that has been set using a temporal data amount of the data which is held in the holding means at a time of starting decoding of the data with the decoding means and using jitter that occurs at a time of transmission of the data.

6. The information processing device according to claim 1, wherein the determination means further includes addition means for adding information to the data being held in the holding means.

7. The information processing device according to claim 6, wherein the addition means adds information to the data in the holding means on a predetermined-data-amount-by-predetermined-data-amount basis.

8. The information processing device according to claim 6, wherein the information added to the data being held in the hold means includes arrival-time information.

9. The information processing device according to claim 8, wherein the arrival-time information is earliest arrival-time information.

10. The information processing device according to claim 8, wherein the arrival-time information is latest arrival-time information.

11. An information processing method for an information processing device including
reception means for receiving data for streaming playback,
holding means for holding the data that has been received by the reception means,
decoding means for reading and decoding the data that is held in the holding means and that has been encoded in a predetermined manner, determination means for performing determination, and control means for performing control, the information processing method comprising the steps of:

determining, with the determination means, from a temporal data amount of the data that is held in the holding means, whether or not a speed of a decoding process performed by the decoding means is appropriate;

and controlling, with the control means, on the basis of a result of determination performed by the determination means, the speed of the decoding process performed by the decoding means, in which the temporal data amount refers to an amount of data held in the holding means for a playback time, wherein the amount is obtained from a count of a number of PCR (program clock reference) packets wherein a PCR is inserted every 100 msec between streams of packets; and wherein all program association tables and PMTs for the streams that are held in the holding means are analyzed as part of obtaining the temporal data amount.

12. A non-transitory computer-readable medium having stored thereon a program causing a computer to perform a process comprising the steps of:

receiving data for streaming playback;

holding the data that has been received;

reading and decoding the data that is held and that has been encoded in a predetermined manner;

determining, from a temporal data amount of the data that is held, whether or not a speed of a decoding process is appropriate;

and controlling the speed of the decoding process on the basis of a result of determination, in which the temporal data amount refers to an amount of data held in the holding means for a playback time, wherein the amount is obtained from a count of a number of PCR (program clock reference) packets wherein a PCR is inserted every 100 msec between streams of packets; and wherein all program association tables and PMTs for the streams that are held in the holding means are analyzed as part of obtaining the temporal data amount.

* * * * *